US005900887A

United States Patent [19]

Leung et al.

[11] Patent Number: 5,900,887
[45] Date of Patent: May 4, 1999

[54] MULTIPLEXED WIDE INTERFACE TO SGRAM ON A GRAPHICS CONTROLLER FOR COMPLEX-PATTERN FILLS WITHOUT COLOR AND MASK REGISTERS

[75] Inventors: Clement K. Leung, Fremont; Ravi Ranganathan, Cupertino, both of Calif.

[73] Assignee: NeoMagic Corp., Santa Clara, Calif.

[21] Appl. No.: 08/850,467

[22] Filed: May 5, 1997

[51] Int. Cl.[6] .......................... G06F 13/16

[52] U.S. Cl. .......................... 345/521; 345/515; 345/516; 345/519; 345/523; 345/524; 345/525; 365/230.03

[58] Field of Search .......................... 345/521, 516, 345/515, 507, 509, 501, 519, 523–525; 365/230.03, 185.11; 395/280

[56] References Cited

U.S. PATENT DOCUMENTS

| | | | |
|---|---|---|---|
| 4,620,186 | 10/1986 | Krause et al. | 340/703 |
| 5,142,637 | 8/1992 | Harlin et al. | 711/106 |
| 5,282,177 | 1/1994 | McLaury | 365/230.05 |
| 5,315,560 | 5/1994 | Nishimoto et al. | 365/238.5 |
| 5,319,606 | 6/1994 | Bowen et al. | 365/230 |
| 5,323,346 | 6/1994 | Takahashi | 355/189.05 |
| 5,381,376 | 1/1995 | Kim et al. | 365/230.03 |
| 5,394,172 | 2/1995 | McLaury | 345/189 |
| 5,394,535 | 2/1995 | Ohuchi | 395/425 |
| 5,473,566 | 12/1995 | Rao | 365/189.12 |
| 5,473,573 | 12/1995 | Rao | 365/230 |
| 5,497,352 | 3/1996 | Magome | 365/230.03 |
| 5,506,814 | 4/1996 | Hush et al. | 365/230.03 |
| 5,511,025 | 4/1996 | Smith et al. | 365/189.05 |
| 5,553,252 | 9/1996 | Takayanagi et al. | 395/310 |
| 5,764,963 | 6/1998 | Ware et al. | 345/507 |
| 5,781,496 | 7/1998 | Pinkham et al. | 365/230.03 |
| 5,787,046 | 7/1998 | Furuyama et al. | 365/230.03 |
| 5,802,006 | 9/1998 | Ohta | 365/230.03 |

FOREIGN PATENT DOCUMENTS

| | | | |
|---|---|---|---|
| WO9530220 | 4/1994 | WIPO | G09G 5/14 |
| WO9627883 | 3/1995 | WIPO | G11C 11/401 |

OTHER PUBLICATIONS

Micron MT41LC256K32D4 Synchronous Graphics RAM datasheet, Micron Technology, 1995 UPD481850 Synchronous GRAM datasheet, NEC Corp., Dec. 6, 1994.

*Primary Examiner*—Kee M. Tung
*Assistant Examiner*—Sy D. Luu
*Attorney, Agent, or Firm*—Stuart T. Auvinen

[57] ABSTRACT

A graphics controller chip has an integrated graphics memory. A wide data interface is provided to a RAM array storing graphics pixel data in the graphics memory. The wide data interface provides 256 bits of data during normal writes, but in a block-write mode the wide data interface is split into two sections. One section contains 128 bits of data, while a second section contains 128 mask bits. The data is replicated to eight half-width columns in the RAM array, while the mask bits disable writing some of the data to the RAM. Separate byte-mask bits can be provided for disabling bytes during normal mode writes, but these byte-mask bits cause multiple copies of the data to be disabled. Thus the mask bits in the second section are more useful as they can disable any individual byte in any of the eight columns. A block write of 64 2-byte pixels can be performed in a single step, as no color-data register and no mask register is needed. The 128 bits of data provide an 8-pixel data pattern which is copied to eight columns. The 8-pixel data pattern provides a complex 8-color pattern for background fills behind foreground graphics data.

17 Claims, 8 Drawing Sheets

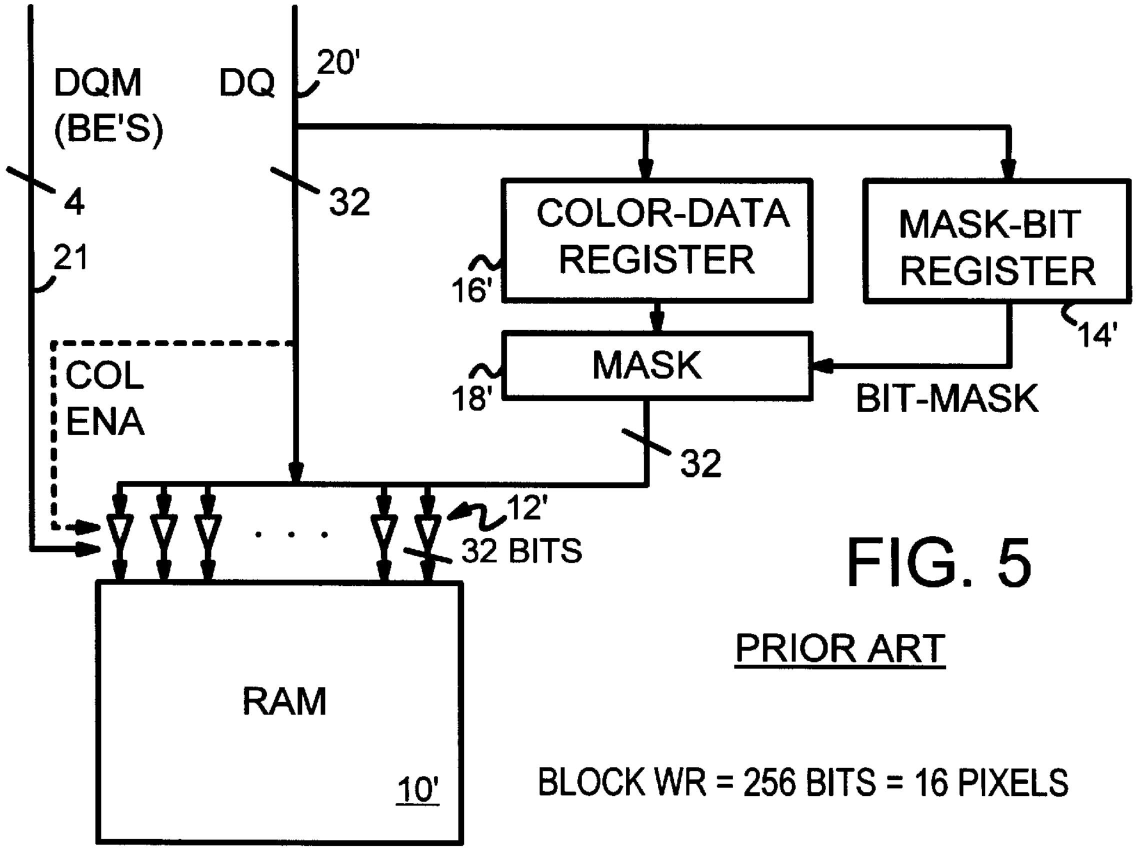
FIG. 5
PRIOR ART
FIG. 6
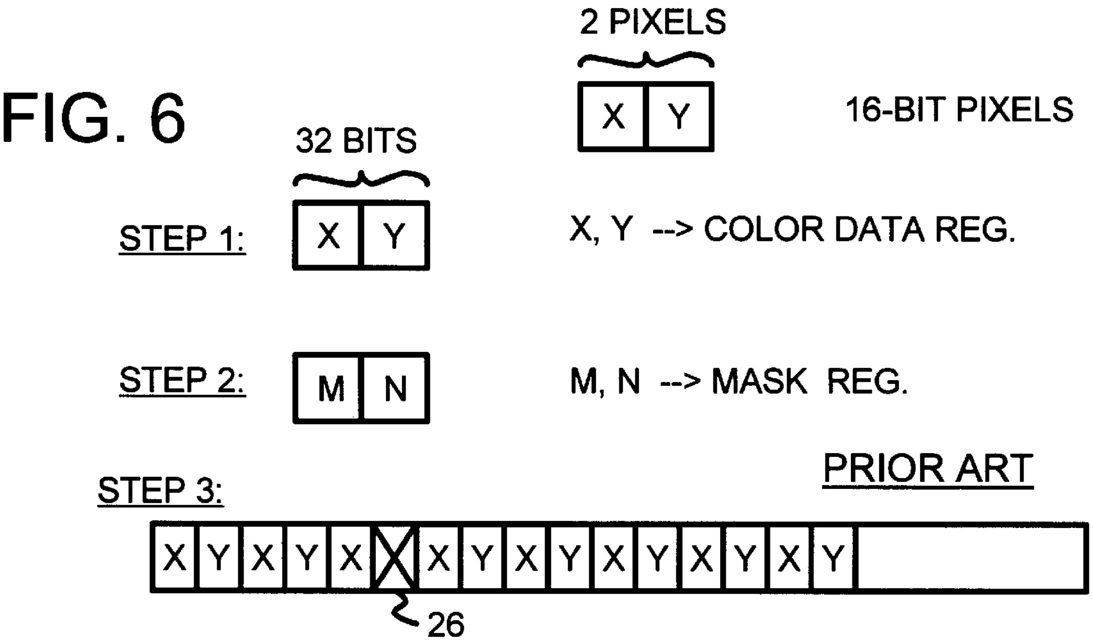
PRIOR ART

ONE-PIXEL PATTERN

4-PIXEL BLK-WR

2-PIXEL PATTERN

16-PIXEL BLK-WR

8-PIXEL PATTERN

64-PIXEL BLK-WR

FIG. 9
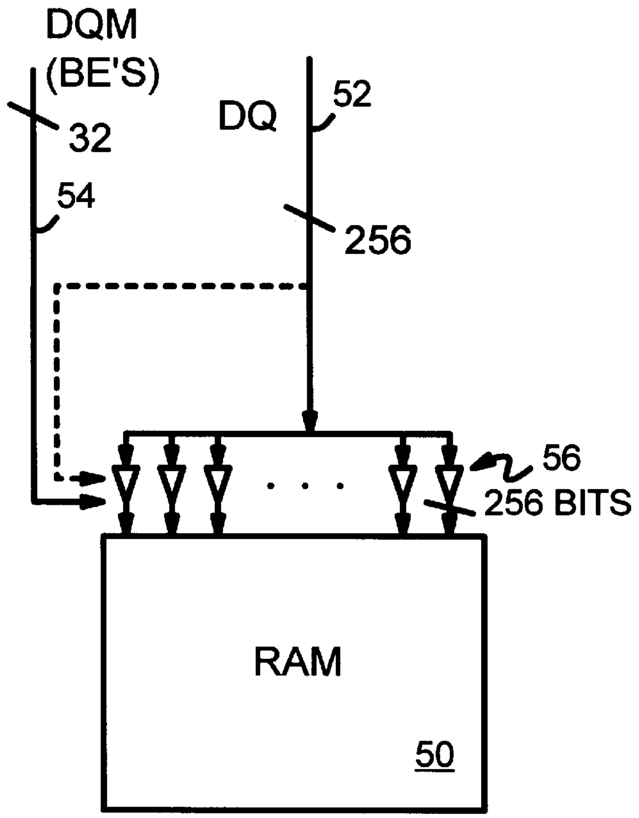
NORMAL WR
256 BITS = 16 PIXELS
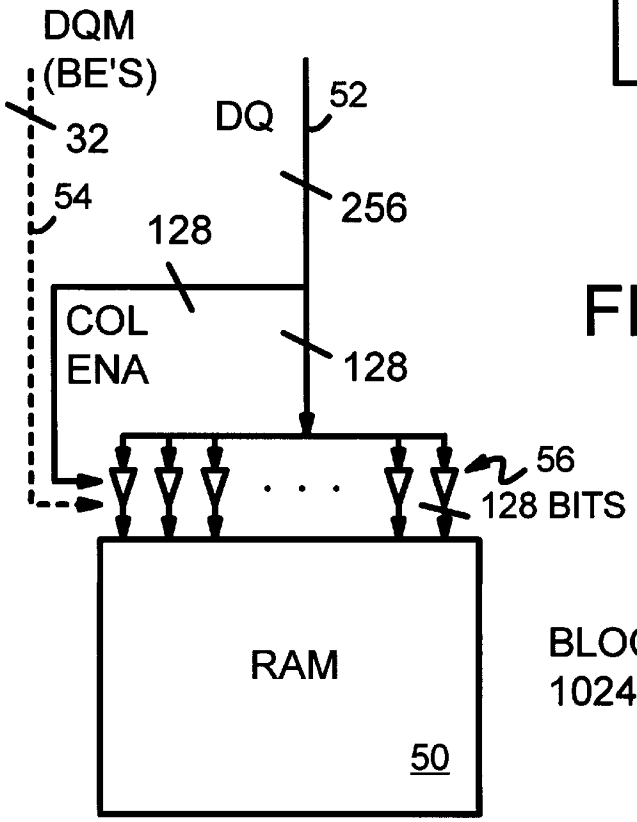
FIG. 10
BLOCK WR
1024 BITS = 64 PIXELS FIG. 13
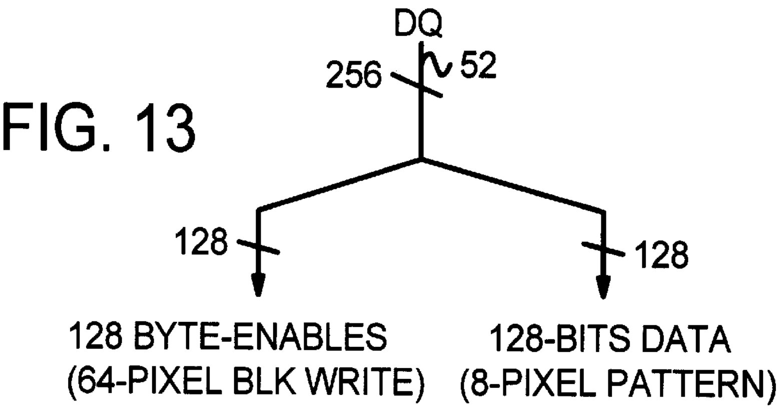
FIG. 14
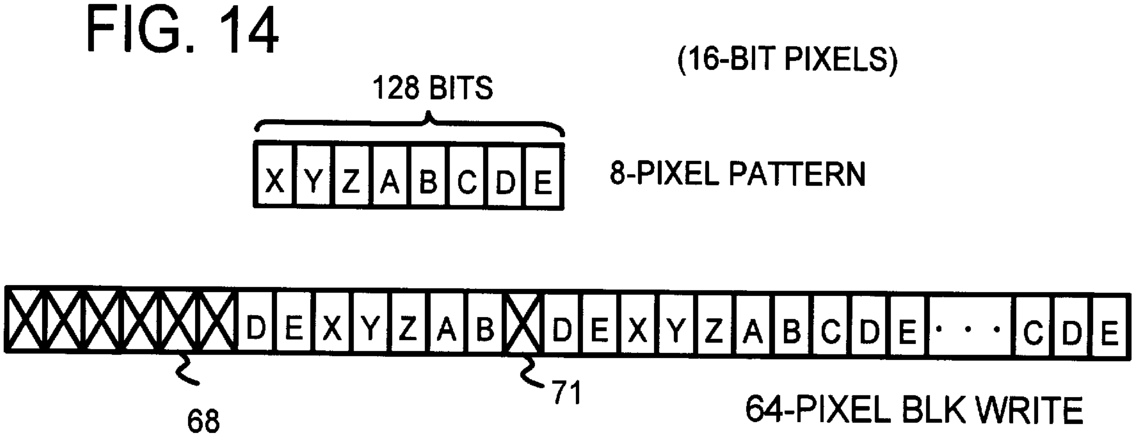
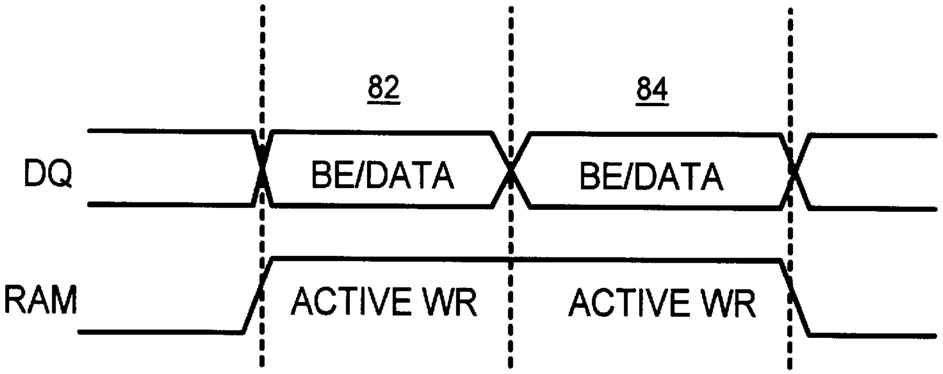
FIG. 15

MULTIPLEXED WIDE INTERFACE TO SGRAM ON A GRAPHICS CONTROLLER FOR COMPLEX-PATTERN FILLS WITHOUT COLOR AND MASK REGISTERS

BACKGROUND OF THE INVENTION

1. Field of the Invention

This invention relates to graphics memories, and more particularly to video memories with block-write operations using a wide interface.

2. Description of the Related Art

Graphics systems use graphics or video memory to store display information. The display information is commonly stored as a bit-map of the lines of pixels displayed on a display screen, or as textual characters which index a character bit-map to convert the characters to pixels. The video memory stores all of the pixels in display frame, and these pixels are sequentially fetched to refresh a display screen, such as a cathode-ray-tube (CRT) or a flat-panel display.

The host processor, which executes user programs and the operating system, updates the displayed image by writing new pixels to the video memory. Many parts of the screen display the same color without any foreground features. For example, a window may have a large amount of white space, while a desktop background may be a featureless blue color. Moving the window causes the host processor to update the bit-map of the screen in the video memory by writing new pixels to the video memory. Since large parts of the screen are of the same color, many of the pixels written to the video memory are identical. The data values written from the host processor to the video memory are likewise identical for these identical pixels.

Specialized memory chips are available which exploit the fact that many identical pixels are written to the video memory during host updates. A block-write mode allows the data or pixel to be written once to the memory chip, and then copied by the chip to multiple locations in the memory. Thus the host processor does not have to write each pixel location on the screen, but can write larger blocks of identical pixels at the same time using a block write operation.

8-BIT BLOCK-WRITE—FIG. 1

FIG. 1 is a diagram of a prior-art graphics memory with an 8-bit block-write register. An example of such a graphics memory chip with a block-write mode is disclosed in U.S. Pat. No. 5,319,606 to Bowen et al. for "Blocked Flash Write in Dynamic RAM Devices" assigned to IBM Corp. of Armonk, N.Y. An 8-bit data bus (DQ) 20 receives an 8-bit data value representing a pixel from the host processor. Special mode pins on the chip are activated so that the data from data bus 20 is written to color register 16 rather than to RAM array 10. Mask register 14 may likewise be written by the host using data bus 20. A mask written into mask register 14 is used by mask logic 18 to prevent some of the bits from being written. For example, setting the mask bits 6, 7 in mask register 14 prevents bits 6 and 7 of the pixel data in color register 16 from being written to RAM array 10. Masking is useful when only a portion of the pixel is changed, and at the edges of a block being written.

The un-masked bits of pixel data from color register 16 are then written to multiple locations in RAM array 10 when a block-write pin on the chip is activated, or some other sequence or combination of signals is asserted. Column drivers 12 replicate the pixel data from color register 16 to eight columns of 8-bits each in RAM array 10. While all 8 columns could be written at one time, some of the columns may be disabled by driving a zero onto the corresponding bit of data bus 20. Driving a one onto a data bit of data bus 20 enables writing to a column. Thus data bus 20 acts as a column select or enable bus during block write, enabling or disabling some of the columns of column drivers 12. The bit masked is specified on data bus 20 at the trailing edge of the row-address strobe (RAS) when write-enable (WE) is active. Mask logic 18 may also be integrated with column drivers 12 to disable driving masked bits.

A block write can write up to 8 columns of 8-bits per column, a total of 64 bits. For a typical pixel, 16 bits are used for each pixel, although older 8-bit pixels are still used for some graphics resolutions. Thus the 64 bits written during a block write are only 64/16=4 pixels. Since color register 16 is only 8 bits wide, each block of 16-bit pixels require two loads of color register 16 and two block writes.

FOUR STEPS TO BLOCK-WRITE PIXELS WITH 8-BIT COLOR REGISTER

FIG. 2 highlights that at least four steps are needed to block-write 16-bit pixels using an 8-bit color register. A 16-bit pixel has a first 8-bit half X1 and a second 8-bit half X2, so that the whole 16-bit pixel is represented by X1:X2. The first step is to write the first half of the pixel, X1, to the 8-bit color register 16 of FIG. 1. A block write is performed in the second step, where X1 from the color register is written to 3 of the 8 columns by setting data bus 20 to 10101000. Five of the columns are not written. The last two columns are not written because a foreground image has already been written to the pixel in the last two column. The background color fill only writes the three pixels in columns 1–6.

Since only 8 bits of the 16-bit pixel may be loaded into the 8-bit color register, the second half of the pixel, X2, is written to the color register in step 3. Then in step 4 the second half of the pixel is block-written to columns 2, 4, 6 by setting data bus 20 to 01010100. This 4-step procedure wrote 3 full pixels using block-write, which is more efficient than the 6 steps requires to randomly write the 3 16-bit pixels using an 8-bit data bus. When the mask register is also used, then an additional step is needed to load the mask register.

FIG. 3 highlights that each block-write operation in general requires three steps: one step to load the pixel data into the color register, a second step to load the mask value into the mask register, and a third step to write the pixel data to multiple columns in RAM array 10. In step 1, the pixel data is written to color register 16 over data bus 20. In step 2, the mask value is written to mask register 14 over data bus 20. In step 3, the pixel data from color register 16 is optionally masked by mask logic 18, and then input to column drivers 12. Column-enable signals are input on data bus 20 to enable some or all of the 8 columns by enabling column drivers 12.

FIG. 4 is a timing diagram illustrating the three steps required to use block write in the graphics memory chip of FIG. 1. In step 1, during time period 22, data bus 20 (DQ) transmits the pixel or color data to the color register where it is stored for a subsequent block-write. RAM array 10 is idle since the data is written to the color register external to the RAM array. In step 2, during time period 23, data bus 20 (DQ) transmits the mask value to the mask register where it is stored for a subsequent block-write. RAM array 10 is again idle since the data is written to the mask register external to the RAM array. In step 3, during time period 24, the pixel data from the color register is masked and replicated by the column drivers and written to multiple locations in the RAM array, which is active. The data bus is used for the column-enable signals rather than for data. When the same pixel is written to many locations, the first step can be skipped for later block writes using the same pixel data, improving efficiency somewhat.

32-BIT COLOR REGISTER—FIG. 5

The limited size of the block write of FIGS. 1–2 can be improved by a wider color register. The MT41LC256K32D4 synchronous graphics RAM (SGRAM) chip by Micron Technology of Boise, Id. is an example of a 32-bit graphics memory chip. FIG. 5 is a diagram of a graphics memory chip with a 32-bit color register. Data bus 20' is 32-bits wide, and writes a 32-bit mask to mask register 14' or 32 bits of pixels data to color register 16'. During the second step, when the pixel data from color register 16' is written to RAM array 10', the 32 data bus 20' lines act as 32 byte-enables for the eight 4-byte columns driven by column drivers 12'. Four byte-enables 21 (DQM) are also provided to disable bytes during normal writes.

The 32-bit color register can hold two 16-bit pixels, and a block-write operation writes up to eight 32-bit columns, or 256 bits. This is equivalent to 16 pixels in a single block-write operation. However, the wider interface requires more pins on the chip and a more expensive package than the 8-bit color register.

FIG. 6 illustrates block write using a 32-bit color and mask registers. The 32-bit color register holds two complete 16-bit pixels, X, Y, while the 32-bit mask register contains a 32-bit mask value. In step 1, pixels X and Y are loaded into the color register. During step 2, the mask value is written to the mask register. In step 3, these pixels are masked and written to multiple locations in the RAM array as a block write. FIG. 6 shows that one pixel 26 is disabled by de-asserting the corresponding column/byte select signal on data bus 20'.

The 32-bit color register can hold two different pixels. While both pixels can be the same color when a solid color fill is desired, more complex backgrounds are common today. These complex backgrounds use multiple colors or shades of color to display a complex background pattern, such as a multi-colored wallpaper on a Windows-based PC. Simply extending the size of the color register to accommodate more pixels is problematic since the data bus also increases in size, and the number of pins on a memory chip is limited. It is therefore desired to perform complex pattern fills rather than simple one- or two-color fills. It is desired to integrate the graphics memory onto the same die as the graphics controller to reduce the number of pins required.

While block-write functions are useful, a more efficient block-write operation is desired. It is desired to perform block write in a single step without first loading a color or a mask register.

SUMMARY OF THE INVENTION

A graphics memory has a split interface for block writes. The graphics memory has a random-access memory (RAM) array with rows and columns of memory cells. A data bus has n data signals for writing n data bits to n memory cells in the RAM array during a normal write cycle.

A block-write means splits the data bus with the n data signals into a data section and a mask section during a block-write cycle. The data section has m data signals and the mask section has q mask signals. The value of m is less than n and q is less than n. A multi-column write means is coupled to the m data signals. It writes y multiple copies of the m data signals to y multiple columns in the RAM array during the block-write cycle.

Masks means is coupled to the m data signals. It disables the writing of any portion of the m data signals to one of the y multiple columns in the RAM array in response to an asserted mask bit in the q mask signals. Thus the data bus is split into the data section and the mask section during a block-write cycle, but not split during a normal write cycle.

In further aspects of the invention the m data signals and the q mask signals are transmitted over the data bus simultaneously in a single cycle. Thus additional cycles to load a color-data register or a mask register are not needed.

In further aspects a global mask bus contains z global mask signals. It disables the writing of a portion of the memory cells in each column for all columns when a global mask signal is asserted. Thus the global mask bus disables writing the portion of memory cells during the normal write cycle.

During the block-write cycle y*m memory cells are written when none of the q mask signals are asserted. However, each of the q mask signals disables one byte of data written to the y*m memory cells. Thus the mask section contains byte mask signals to mask any of the bytes of data written to any of the y multiple columns during the block-write cycle.

In still further aspects the n data signals of the data bus are not directly connected to I/O pins of a chip. Thus the data bus is comprised of internal signals. The graphics memory is integrated on a same die as a graphics controller chip so that the data bus is an interface to a host interface or a BIT-BLT accelerator inside the graphics controller chip.

BRIEF DESCRIPTION OF THE DRAWINGS

FIG. 5 is a diagram of a graphics memory chip with a 32-bit color register.

FIG. 6 illustrates block write using a 32-bit color register.

FIG. 9 is a diagram of an integrated synchronous graphics random-access memory (SGRAM) for normal-mode writes using an unusually wide interface without a color-data register.

FIG. 10 is a diagram of an integrated SGRAM during block-write mode when the wide interface is split to eliminate the color-data register.

FIG. 13 highlights the wide interface being split for pixel-data and mask-control signals during block-write mode.

FIG. 14 illustrates a 64-pixel block write with one pixel masked off to prevent over-writing the foreground graphics data.

FIG. 15 is a timing diagram of block writes using the split data interface to the SGRAM.

DETAILED DESCRIPTION

The present invention relates to an improvement in block-write for graphics memories. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

COMPLEX PATTERN-FILLS BEHIND GRAPHICS-FOREGROUND DATA

Figures 7, 8A, 8B, 8C:
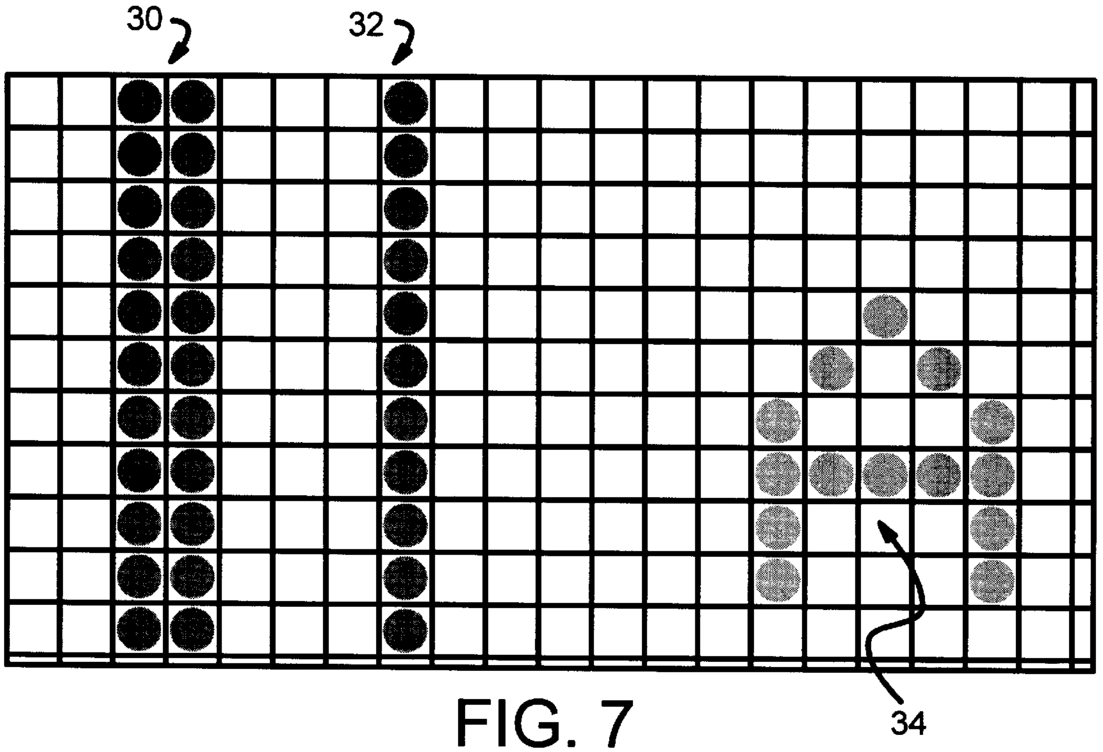
FIG. 7 shows graphics foreground data.
FIG. 8A shows that the 8-bit color register supports block write of a single-pixel pattern.
FIG. 8B shows that the 32-bit color register allows for a 2-color pattern.
FIG. 8C shows that the invention allows for an 8-pixel pattern of up to 8 different colors.

FIG. 7 shows graphics foreground data. An application program or operating system writes display information as foreground data. Line 30 is a 2-pixel-wide vertical line while line 32 is a single-pixel-wide line of foreground data. Text character 34 is an example of more complex foreground data. The remaining pixel locations not occupied by the foreground data of lines 30, 32 and text character 34 are filled in with a background pattern. Background patterns can be a solid color or a repeating pattern such as a checkerboard or gradient. Solid patterns were common on lower-performance systems, but now complex patterns are commonly used. Unique, non-repeating patterns are sometimes used as well.

Background pixels are filled by performing block writes. Foreground pixel-data is left intact by disabling the writing of pattern-fill pixels where foreground pixels are present. A foreground mask is used to disable writing over the foreground data. Individual pixels can be enabled and disabled during block writes, allowing rapid background filling behind complex shapes such as text character 34. Note that the pattern is even filled between the lines of pixels of textual character 34.

FIG. 8A shows that the 8-bit color register supports block write of a single-pixel pattern. Multiple-pixel patterns require re-loading of the color register and repeating the block write for each additional color. FIG. 8B shows that the 32-bit color register allows for a 2-pixel pattern having one or two colors. Each block write fills 16 pixels. However, additional loads of the color register and additional block writes are necessary when the pattern has more than 2 colors, or is longer than 2 pixels.

The inventors have seen the need for more complex patterns, and the need to eliminate the color register. FIG. 8C shows that the invention allows for an 8-pixel pattern of up to 8 different colors. Each block write fills 64 pixels in a single step or cycle.

Table 1 shows the number of write cycles required for background pattern fill of a 400-line by 400-pixel-wide rectangle. Block writes are compared to standard writes. Greater color-data size dramatically increases the efficiency of block writes. Not only are more complex patterns supported, but the increased length of the block write drastically improves efficiency. Table 1 assumes that the color registers have already been written; additional cycles beyond those in Table 1 are often needed to load pixels into the prior-art color registers.

TABLE 1

Block Write Efficiencies

| # Pixels per Std. Write | # Pixels per Block Write | Color Size | Std. Writes Per Line | Block Writes Per Line | Total Block Writes |
|---|---|---|---|---|---|
| .5 | 4 | ½ Pixel | 800 | 100 | 40,000 |
| 2 | 8 | 2 Pixels | 200 | 25 | 10,000 |
| 16 | 64 | 8 Pixels | 25 | 7 | 2,800 |

GRAPHICS RAM OPERATES IN 2 MODES

The graphics memory operates in one of two modes: standard or normal mode and split-block-write mode. FIG. 9 is a diagram of an integrated synchronous graphics random-access memory (SGRAM) for normal-mode writes using an unusually wide interface without a color-data register. Data lines 52 is a wide interface of 256 data bits. Since RAM array 50 is integrated within a graphics controller chip, I/O pins are not needed for data lines 52, and a wide interface can be used. Address inputs are decoded to select one of many rows in RAM array 50 as is well-known in the art (not shown).

The 256 data bits from data lines 52 are connected to column drivers 56, which drive 256-bit columns of data memory cells in RAM array 50. Address bits are decoded to select one column for writing, enabling the column driver for the decoded column and disabling all other column drivers.

Byte-mask input 54 contains 32 DQ mask bits or byte-enable signals. Each mask bit in byte-mask input 54 enables or disables one byte of the 32 bytes making up the 256 data bits from data lines 52. Masking individual bytes is performed by connecting byte-mask input 54 to each 256-bit column of column drivers 56. Buffering of byte-mask input 54 may be necessary (not shown).

For graphics modes with 16 bits per pixel, each pixel requires 2 bytes. The 256 data bits are 32 bytes, or 16 pixels. Thus no more than 16 pixels are written during a normal write cycle. Fewer pixels are written when some bytes are masked off by byte-mask input 54. While 16-pixel writes are significantly more efficient than prior-art SGRAM's, an even more efficient block-write mode is desirable for complex-pattern fills.

BLOCK WRITES WITH SPLIT INTERFACE—FIG. 10

FIG. 10 is a diagram of an integrated SGRAM during block-write mode when the wide interface is split to eliminate the color-data register. Address bits are decoded to select one row as in normal-write mode. While prior-art SGRAM's used a color-data register to store the pixel data written during a block write, the invention eliminates the color-data register. Instead, the wide data interface is split during block writes. Half of data lines 52 are used for the pixel data, while the other half of data lines 52 are used for masking individual pixels.

The 256 data lines 52 are split into a 128-bit pixel-data section which is input to column drivers 56, and a 128-bit mask section which forms enable control signals to column drivers 56. During a block write, eight 128-bit columns of memory cells in RAM array 50 are written. Each 128-bit column is 16 bytes and requires 16 byte-mask enable signals. Thus eight columns are a total of 8×16 bytes, or 128 bytes. The 128-bit mask section of data lines 52 contains one byte-mask signal for each of the 128 bytes written during a block write.

Byte-mask input 54 is normally set to enable all 32 bytes during block-write mode. However, any byte disabled by byte-mask input 54 is replicated to all 8 columns being written in block-write mode. Thus each byte disabled by byte-mask input 54 causes 8 bytes to be disabled of the 128-byte block write.

Each block write cycle writes 8 columns of 128-bits per column, or 1024 bits. This is equivalent to 128 bytes, or 64 pixels. Both the pixel data and the byte-mask are simultaneously presented to RAM array 50 over the split interface of data lines 52 in a single cycle. No color-data register is needed, and the extra step of loading a color-data register is avoided.

WIDE INTERFACE FOR NORMAL WRITES—FIG. 11

Figure 11:
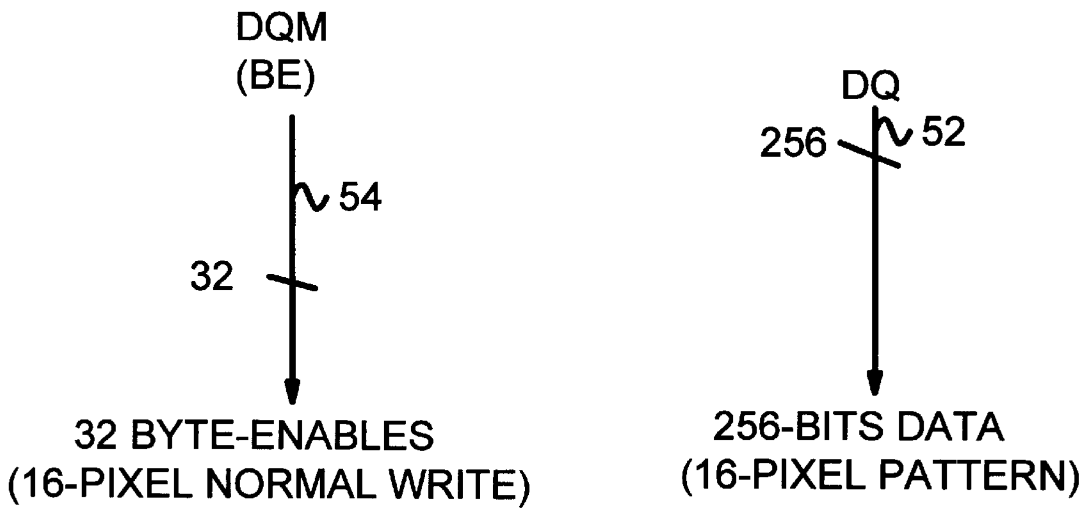
FIG. 11 highlights the wide interface for normal writes.

FIG. 11 highlights the wide interface for normal writes. All 256 input signals in data lines 52 are used for pixel data during normal-write mode. The 256 data bits are 32 bytes, or 16 pixels. A 16-pixel pattern may be filled by repeatedly applying the same 256 data bits to data lines 52. Byte-mask input 54 provides 32 mask signals for enabling or disabling each of the 32 bytes in the 256 bits being written. Disabling or masking one pixel in the 16-pixel write is accomplished by masking two adjacent, aligned bytes by asserting two signals in byte-mask input 54.

BYTE-GRANULARITY IN NORMAL MODE—FIG. 12

Figure 12:
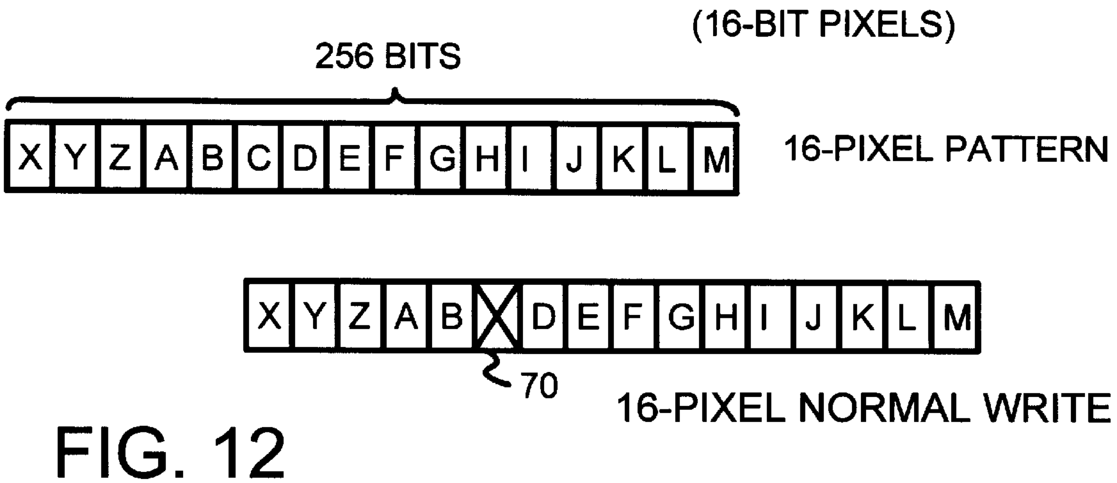
FIG. 12 illustrates a 16-pixel write in normal mode with one pixel masked off to prevent over-writing of foreground graphics data.

FIG. 12 illustrates a 16-pixel write in normal mode with one pixel masked off to prevent over-writing of foreground graphics data. The 256 data bits are 16 pixels, labeled pixels X, Y, Z, A, B . . . M. When foreground graphics data is present at the pixel locations being written, then the byte-mask bits are used to disable writing one or more of the 16 pixels. Pixel 70, the 6th pixel, is disabled by asserting the 11th and 12th mask signals in byte-mask input 54 of FIGS. 9 and 11. Pixel 70 is at a location that has a foreground pixel which is not to be over-written.

SPLIT INTERFACE SIMULTANEOUSLY INPUTS DATA AND MASK—FIG. 13

While the wide interface provides efficient writes, a block-write mode increases efficiency by simultaneously writing a pattern to multiple columns in the RAM array. FIG. 13 highlights the wide interface being split for pixel-data and mask-control signals during block-write mode. Data lines 52 contain 256 signals which are all used for pixel data in normal mode. In block-write mode, half of these signals are used for data and the other half used for mask control. Thus one 128-bit half of data lines 52 is used for pixel data, and the other 128-bit half is used for 128 byte-mask enables.

The 128 data bits are equivalent to 16 bytes, or 8 pixels. However, these 16 bytes are replicated to 8 columns in the RAM array, so that a total of 16 bytes×8 columns or 128 bytes are written. The 128-bit byte-mask signals from the second half of data lines 52 allow individual bytes to be enabled or disabled.

FIG. 14 illustrates a 64-pixel block write with one pixel masked off to prevent over-writing the foreground graphics data. Since only half of the data lines are used for pixel data, the size of the repeated pattern of pixels is reduced from 16 to 8 pixels for block writes. However, these 8 pixels in the 128-bit pattern are copied to 8 columns in the RAM array. Thus a total of 64 pixels may be written in a single block-write cycle.

The 128 data bits in the repeated pattern are 8 pixels, labeled pixels X, Y, Z, A, B, C, D, E. When foreground graphics data is present at the pixel locations being written, then the byte-mask bits in the 128-bit half of the 256 data lines are used to disable writing one or more of the 64 pixels. Pixel 71, the 14th pixel, is disabled by asserting the 27th and 28th mask signals in the 128 byte-mask inputs of data lines 52. Pixel 71 is at a location that has a foreground pixel which is not to be over-written.

The first 6 pixels 68 are also masked off. The first 12 mask signals in the 128-bit half of data lines 52 are asserted to disable writing to these first 6 pixels 68. First 6 pixels 68 may be a foreground border of a window being updated.

Thus during block write the data lines are split into two 128-bit sections for data and the mask. The 128 bits of data form a 16-byte (8 pixel) pattern written to 8 columns, for a total of 128 bytes (64 pixels). Individual bytes or pixels can be masked so that the background pattern does not over-write foreground pixels.

DATA INTERFACE ELIMINATES COLOR AND MASK REGISTERS

Splitting the data lines into a data field and a mask field allows both the data and the mask to be input to the graphics memory at the same time. No color-data register is needed for the data, since the data is sent to the RAM over half of the data lines. A mask register is not needed since the byte-mask is sent to the graphics memory on the other half of the data lines.

LOAD CYCLES NOT NEEDED—FIG. 15

Figure 1:
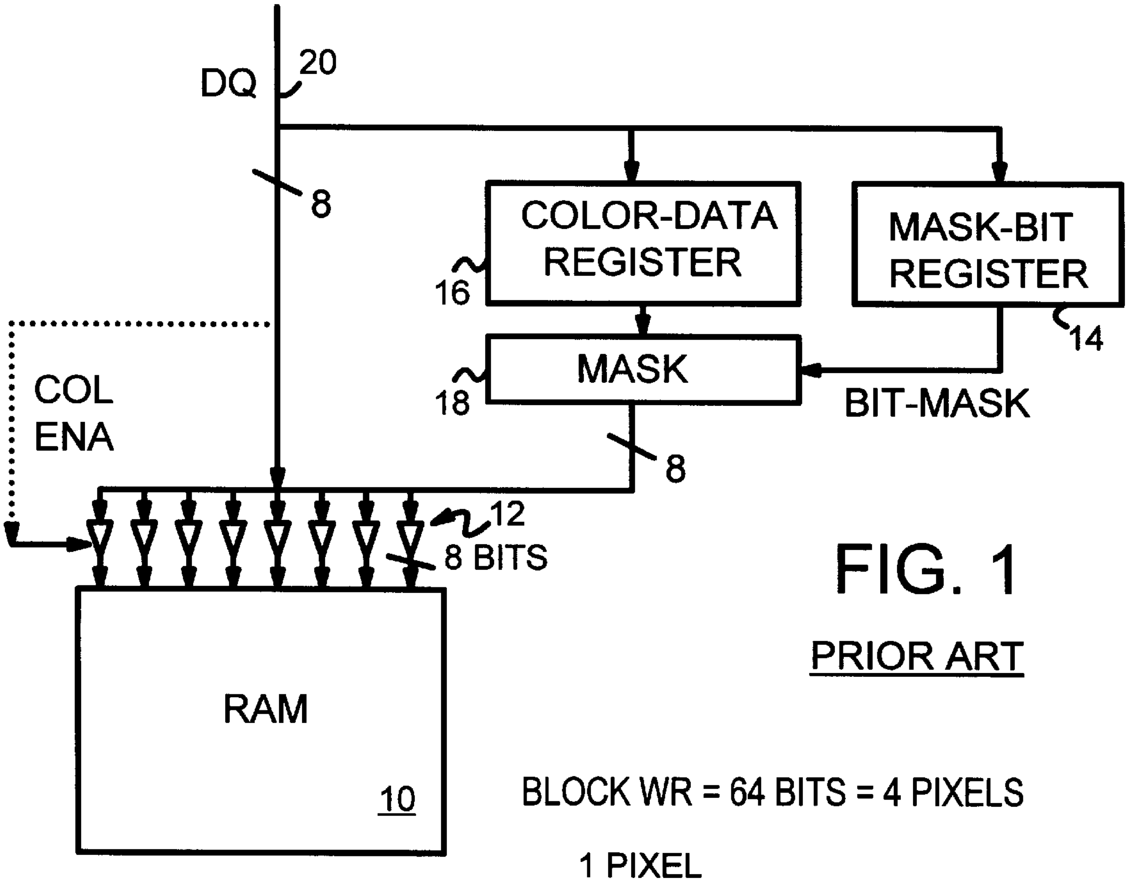
FIG. 1 PRIOR ART
FIG. 1 is a diagram of a prior-art graphics memory with an 8-bit block-write register.
Figure 2:
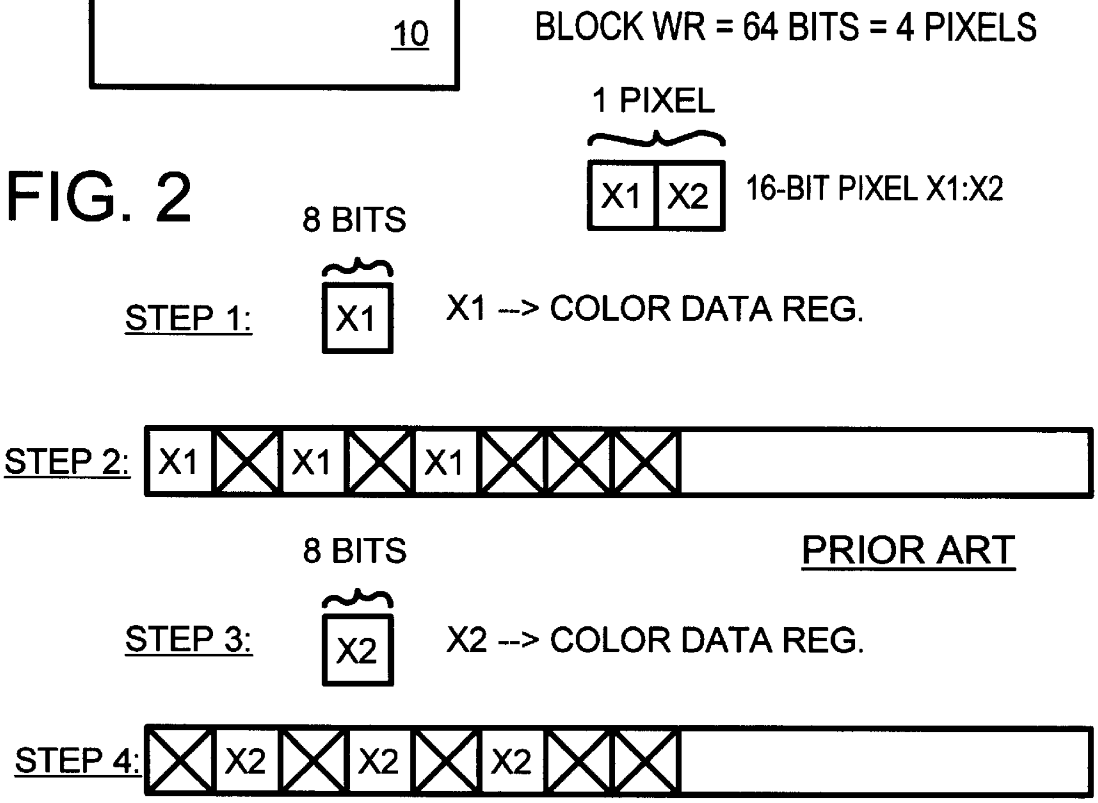
FIG. 2 PRIOR ART
FIG. 2 highlights that at least four steps are needed to block-write 16-bit pixels using an 8-bit color register.
Figure 3:
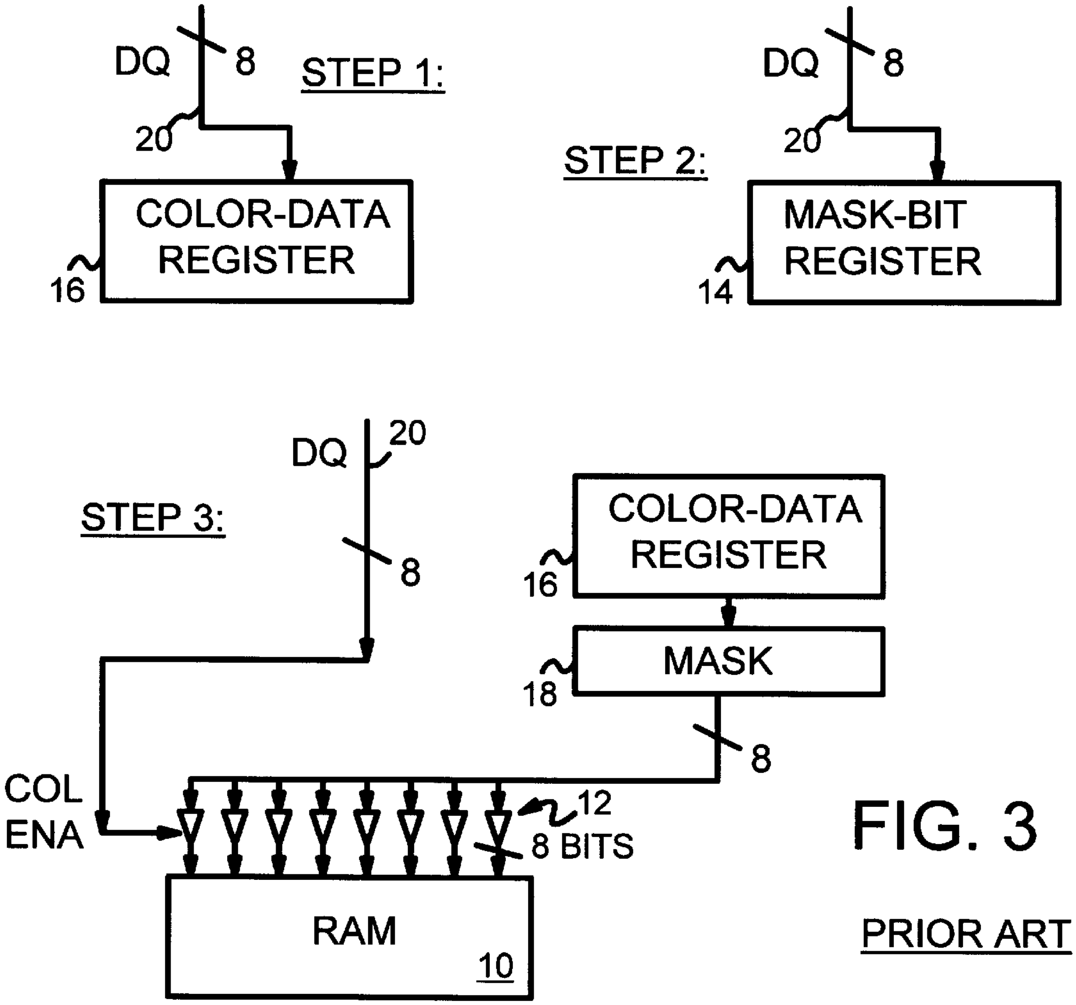
FIG. 3 PRIOR ART
FIG. 3 highlights that each block-write operation requires three steps: one step to load the pixel data into the color register, a second step to load the mask value into the mask register, and a third step to write the pixel data to multiple columns in RAM array.
Figure 4:
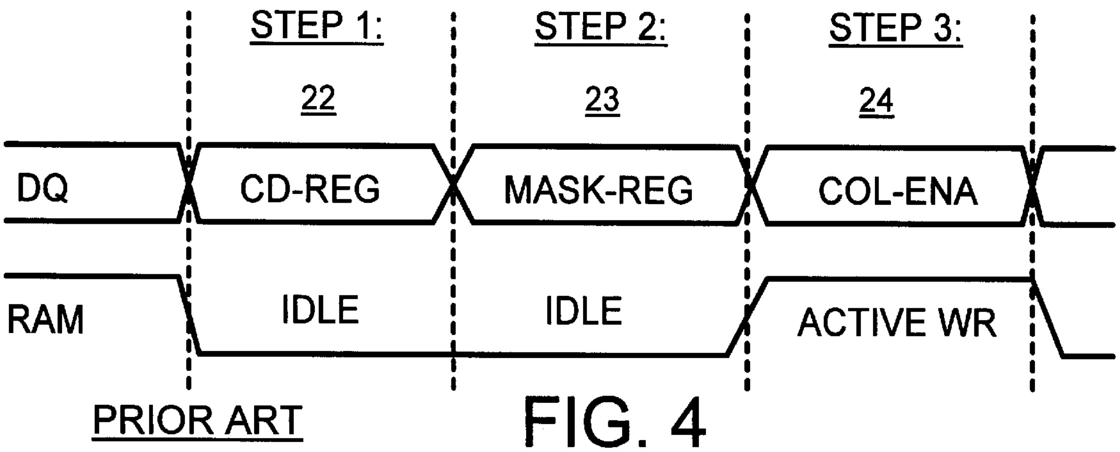
PRIOR ART FIG. 4
FIG. 4 is a timing diagram illustrating the three steps required to use block write in the graphics memory chip of FIG. 1.

Eliminating the color and mask registers is more efficient because an extra step to load these registers is not needed. FIG. 15 is a timing diagram of block writes using the split data interface to the SGRAM. During cycle 82, the 128-bit data pattern and the 128 byte mask bits are together transmitted to the graphics memory on the DQ data lines. The RAM array writes the 128-bit pattern to 8 columns during cycle 82. In next cycle 84, the 128-bit data pattern is again presented with a different 128-bit byte mask on the DQ data lines, and the RAM array writes the data to 8 columns. No extra cycles are needed to load the color-data register as was shown for the prior art in FIG. 4.

Eliminating color-register load cycles can increase the available bandwidth of the graphics memory. Bandwidth is critical as the graphics memory is constantly being read to fetch pixels to refresh the display. Reducing the number of cycles used by the host interface writing pixel updates increases the number of possible writes from the host in the time left after pixels refresh the display.

GRAPHICS CONTROLLER WITH INTEGRATED BLOCK-WRITE MEMORY

Figure 16:
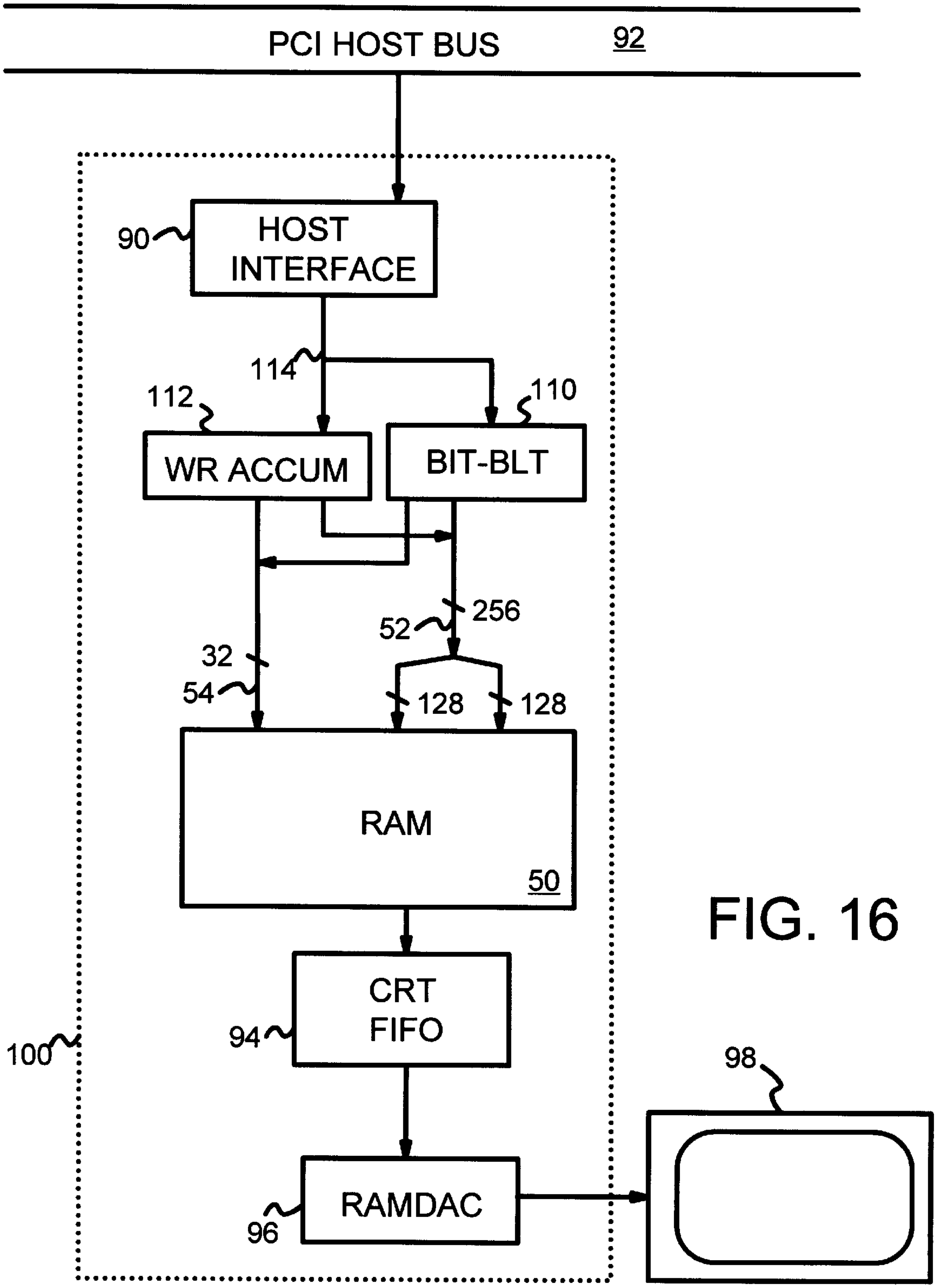
FIG. 16 is a diagram of a graphics controller chip with an integrated memory having a split interface for block writes.

FIG. 16 is a diagram of a graphics controller chip with an integrated memory having a split interface for block writes. Host bus 92 sends pixel updates from a host processor to graphics chip 100, which may be on a graphics adapter card on an expansion bus such as the PCI bus. Host interface 90 receives commands from host bus 92 and reformats these commands into pixel-data updates to the graphics image stored in RAM array 50. A bit-block (BIT-BLT) accelerator 110 is programmed by host interface 90 to generate large blocks of pixel-data updates. BIT-BLT accelerator 110 frees the host processor of generating and writing each pixel in the block.

RAM array 50 is integrated on the same silicon die as other components of graphics controller chip 100. Thus data lines 52 and byte-mask input 54 to RAM array 50 are not chip-to-chip connections requiring I/O pins.

Host interface 90 typically uses normal write cycles for writing new foreground pixels to RAM array 50. Write accumulator 112 is used to hold and combine pixel writes from host interface 90 until a full 256-bit write can be generated. Alternately, write accumulator 112 can be deleted or bypassed and small-width writes can be performed from host interface 90 to RAM array 50. The pixel data is formatted to fit the 256-bit data lines 52, while a mask indicating the location of the foreground data is generated and applied to byte-mask input 54.

When the background pattern fill is to be written behind the foreground data, host interface 90 commands BIT-BLT accelerator 110 to generate block write cycles. Since block write cycles can write as many as 64 pixels in a single cycle, while normal writes update just 16 pixels, block writes are up to four times more efficient than normal writes. Host interface 90 receives the pixel pattern which is transmitted over bus 114 to BIT-BLT accelerator 110. BIT-BLT accelerator 110 transmits 128-bytes of pixel data and 128 byte-mask enables on data lines 52 to RAM array 50. RAM array 50 writes 8 columns with the 128-bits of pixel data in a single cycle.

CRT FIFO 94 reads pixels in a horizontal line from RAM array 50, and individually transmits these pixels to RAMDAC 96. RAMDAC 96 contains a look-up table to re-map the color represented by each pixel to provide for a larger virtual color space. RAMDAC 96 also contains a digital-to-analog converter (DAC) which converts the digital pixels to analog voltages which are driven off graphics controller chip 100 to external CRT 98, where the image is displayed to a user.

A flat-panel controller may be added to graphics controller chip 100 to convert the pixels from CRT FIFO 94 into a digital format for a flat-panel display.

A block-write-enable signal (BWE) can be generated by the BIT BLT to the RAM array to indicate that a block write rather than a normal write be performed. Additional control signals to indicate a read or a write, etc. are generated along with the address.

ALTERNATE EMBODIMENTS

Several other embodiments are contemplated by the inventors. In many applications the entire screen or a large block of the screen is filled with data. Using the normal mode with all 256 bits of data speeds this operation, since no masking is required. The invention is ideally suited, since it allows changing from the split-interface mode, with masking, to the full-interface mode with no masking. The full-width interface can be extended to a dual-column mode where the 256 bits of data are written to two columns, ignoring the lowest-order address bit in the column decode. A four-column mode could also be implemented.

While the wide interface has been split into two equal halves, other splits are possible, with different numbers of mask and data bits. For example, instead of byte enables for mask bits, the mask bits could enable a 16-bit pixel, 2 bytes. Then only 64 mask bits are needed for 128 data bits.

While a 16-bit pixel has been illustrated, other pixel sizes are commonly used. Older systems used 8-bit pixels, and larger 24-bit pixels are also used. High-end graphics systems that render three-dimensional images use a 32-bit texture pixel or "texel" which contains texture information as well as color information. Larger pixel sizes are especially benefited by the invention.

The wide interface can be made wider still. A 512-bit interface is contemplated by the inventors. The 512-bit interface can be split into two equal halves, or into other ratios.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A graphics memory having a split interface for block writing, the graphics memory comprising:

a random-access memory (RAM) array having rows and columns of memory cells;

a data bus having n data signals for writing n data bits to n memory cells in the RAM array during a normal write cycle;

block-write means for splitting the n data signals of the data bus into a data section and a mask section during a block-write cycle, the data section having m data signals and the mask section having q mask signals, wherein m is less than n and q is less than n;

multi-column write means, coupled to the m data signals, for writing y multiple copies of the m data signals to y multiple columns in the RAM array during the block-write cycle; and masking means, coupled to the m data signals, for disabling the writing of any portion of the m data signals to any of the y multiple columns in the RAM array in response to asserted mask bits in the q mask signals;

wherein the m data signals and the q mask signals are transmitted over the data bus simultaneously in a single cycle;

whereby additional cycles to load a color-data register or a mask register are not needed and whereby the data signals of the data bus are split into the data section and the mask section during a block-write cycle, but not split during a normal write cycle.

2. The graphics memory of claim 1 wherein the m data signals and the q mask signals are not stored in a register when transmitted over the data bus to the RAM array, whereby a color-data register is not used.

3. The graphics memory of claim 2 further comprising:

a global mask bus, containing z global mask signals, for disabling the writing of a portion of the memory cells in each column for all columns when a global mask signal is asserted;

whereby the global mask bus disables writing the portion of memory cells during the normal write cycle.

4. The graphics memory of claim 3 wherein during the block-write cycle y*m memory cells are written when none of the q mask signals are asserted.

5. The graphics memory of claim 4 wherein each of the q mask signals is for disabling one byte of data written to the y*m memory cells, whereby the mask section contains byte mask signals for masking any of the bytes of data written to any of the y multiple columns during the block-write cycle.

6. The graphics memory of claim 5 wherein n is 256 bits, whereby the data bus is a wide data interface to the RAM array.

7. The graphics memory of claim 6 wherein q and m are each 128 bits and the y multiple columns comprise 8 columns of 128 bits in width.

8. The graphics memory of claim 2 wherein the multi-column write means and the masking means comprise column drivers for driving the n data signals to memory cells in the RAM array for each column in the RAM array.

9. The graphics memory of claim 2 wherein the n data signals of the data bus are not directly connected to I/O pins of a chip, whereby the data bus is comprised of internal signals.

10. The graphics memory of claim 9 wherein the m data signals comprise a background pattern of pixels for a graphics display.

11. The graphics memory of claim 9 wherein the graphics memory is integrated on a same die as a graphics controller chip, the data bus being an interface to a host interface inside the graphics controller chip, whereby the data bus is an internal data bus.

12. The graphics memory of claim 9 wherein the graphics memory is integrated on a same die as a graphics controller chip, the data bus being an interface to a BIT-BLT accelerator inside the graphics controller chip, whereby the data bus is an internal data bus.

13. A method of performing an update of pixel data for display on a display to a user, the method comprising the computer-implemented steps of:

writing foreground graphics pixels to a video memory using normal write cycles by driving pixel data to all bits of a data bus;

writing a background pattern behind the foreground graphics pixels in pixel locations not containing a foreground graphics pixel by asserting mask signals in a mask section of the data bus for pixel locations containing the foreground graphics pixels and driving pixel data representing the background pattern onto a data section of the data bus; and requesting a block-write cycle during the writing of the background pattern but requesting a normal write cycle during the writing of the foreground graphics pixels, the block-write cycle splitting data signals of the data bus into the mask section and the data section, but the normal write cycle not splitting the data signals of the data bus and using all bits of the data bus for pixel data;

wherein the step of writing the foreground graphics pixels further comprises:

generating a foreground mask indicating the locations of the foreground graphics pixels;

driving the foreground mask to a mask bus when the foreground graphics pixels are driven to the data bus during the normal write cycle;

whereby the data signals of the data bus are split for the block-write cycle but not split for the normal write cycle and whereby the mask bus is used for the normal write cycle but the mask section of the data bus is used for the block-write cycle.

14. The method of claim 13 wherein the foreground mask applied to the mask bus during the normal write cycle is inverted and applied to the mask section of the data bus during the block-write cycle to write the background pattern behind the foreground graphics pixels.

15. The method of claim 14 wherein the step of requesting a block-write cycle comprises asserting a block-write request signal to the video memory.

16. A graphics controller chip with an integrated video memory with a block-write mode, the graphics controller chip comprising:

a host interface, coupled to a host bus, for receiving commands for screen updates from a host processor in a computer;

a BIT-BLT accelerator, coupled to receive commands from the host interface, for generating blocks of pixels for updating the display;

a video memory for storing pixels for display on a screen to a user;

a data bus, connected between the BIT-BLT accelerator and the video memory, for transmitting pixels for writing to the video memory;

a mask bus, connected between the BIT-BLT accelerator and the video memory, for disabling a subset of the pixels on the data bus for writing to the video memory;

block-write means, coupled to the data bus, for splitting the data bus into a data section and a mask section during a block-write cycle, the mask section for masking individual pixels anywhere in a block of pixels, the block of pixels written to the video memory during the block-write cycle being a multiple of the pixels in the data section of the data bus;

wherein the mask section of the data bus masks individual pixels in the block of pixels, the block of pixels being a multiple of the pixels transmitted on the data section of the data bus during the block-write cycle;

a FIFO buffer, receiving pixels from the video memory, for supplying a stream of pixels;

a RAMDAC, receiving the stream of pixels from the FIFO buffer, for converting pixels to analog voltages; and CRT I/O pins on the graphics controller chip, for driving the analog voltages from the RAMDAC to a cable connected to an external cathode-ray-tube (CRT) display, whereby the data bus is split for the block-write cycle into a data section and a mask section.

17. The graphics controller chip of claim 16 wherein the data bus comprises 256 data bits and wherein the host bus contains less than or equal to 64 data bits, whereby the data bus between the BIT-BLT accelerator and the video memory is much wider than the host bus.

* * * * *